H. C. TURNER.
BALL AND SOCKET JOINT.
APPLICATION FILED MAR. 11, 1912.

1,065,483.

Patented June 24, 1913.

Witnesses
E. H. Pollard
C. Severance

Inventor,
Harry C. Turner.
by
Harold Strauss
Attys.

UNITED STATES PATENT OFFICE.

HARRY C. TURNER, OF LOS ANGELES, CALIFORNIA.

BALL-AND-SOCKET JOINT.

1,065,483.　　　　　Specification of Letters Patent.　　Patented June 24, 1913.

Application filed March 11, 1912. Serial No. 682,969.

*To all whom it may concern:*

Be it known that I, HARRY C. TURNER, a citizen of the United States, residing at Los Angeles, in the county of Los Angeles and State of California, have invented new and useful Improvements in Ball-and-Socket Joints, of which the following is a specification.

This invention relates to improvements in ball and socket joint and particularly to a joint movement having a ball and socket action.

It is an object of the invention to provide a mechanical joint for connecting members which normally extend at angles to each other, so that they may articulate properly and yet so that there will be no lost motion or rattling of the parts with respect to each other.

It is also an object of the invention to provide an adjustable ball and socket joint for mechanisms of various kinds, the ball member being so formed that it can only be inserted within the socket member in a certain way, after which it is movably confined therein.

Figure 1:
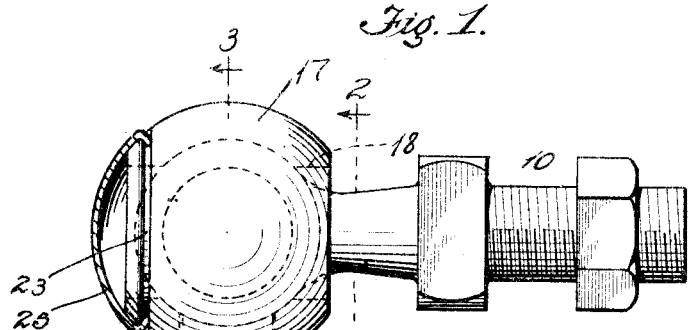
Figure 2:
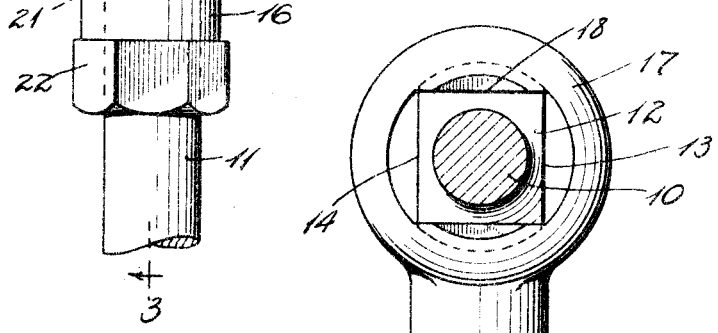
Figure 3:
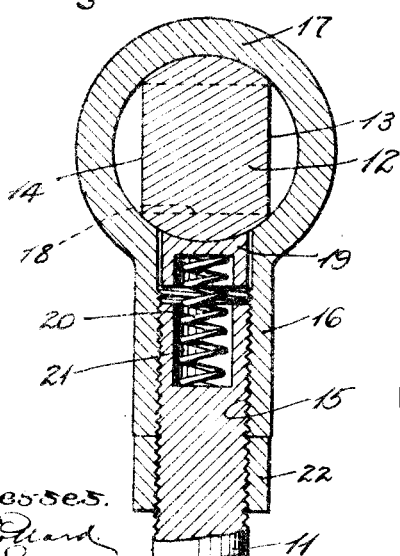
Figure 4:
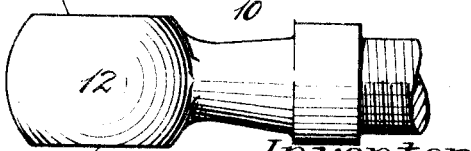

In the accompanying drawing forming a part of this specification, Figure 1 is a plan view of a ball and socket joint constructed in accordance with the present invention, the dust cap thereof being shown in section. Fig. 2 is a sectional view through one member of the joint taken upon the line 2—2 of Fig. 1 and looking at the other member. Fig. 3 is a sectional view through the said joint taken upon the line 3—3 of Fig. 1. Fig. 4 is a plan view of the ball end of the ball member.

The details and features of the invention will now be more particularly described, reference being had to the said drawing in which—

10 indicates the ball carrying member of the mechanical movement and 11 a socket carrying member. The said ball member 10 is formed with a ball or spherical end portion 12, which is preferably flattened upon its opposite side faces as at 13 and 14.

The socket member comprises an arm or shaft 11 having a screw threaded end portion 15, adapted to engage an interiorly threaded sleeve 16 formed with an approximately spherical socket portion 17 upon its outer end. The said socket portion is usually provided with openings at the sides, one or both of which may be formed with parallel side edges 18, whereby the opening is adapted to closely fit the transverse sectional contour of the flattened ball 12. The material of the socket extending along the side edges 18 forms a retaining means for the ball after it has been inserted in the socket and turned therein, preventing the withdrawal thereof. Any wear or slack in the fitting of the ball within said socket is taken up by means of a plunger 19 which is usually made hollow, a spring 20 fitting at one end in the hollow portion thereof and extending at its other end into a socket 21 formed in the end of the arm or shaft 11. A binding nut 22 is also mounted upon the threads of said arm or member 11 and adapted to hold the socket sleeve 16 tightly in place upon the threaded end of said member 11.

It will be understood that the ball member may be inserted in either side of the open socket portion 17 and the other side of said socket portion is usually formed with an annular groove 23, when in position adapted to receive the inwardly crimped edges 24 of a cap plate 25, which forms a grease cup. Dust and dirt are thus excluded from the ball and socket joint within the portion 17, and the same is at all times effectually lubricated.

In assembling the parts the member 10 is turned so that the flattened ball 12, will enter the opening in the side of the socket member after which the said member 10 is turned 90°, or so that the flattened sides of the ball member will extend at right angles to the flattened retaining edges 18 of the socket member. The member 10 is secured to any other parts to which it is to be connected and the two members 10 and 11 can then not be separated. The spring actuated plunger 19 prevents any looseness or rattling of the parts.

What I claim is:

An adjustable ball and socket joint, comprising a member having a ball at one end flattened forming oppositely-disposed plane faces parallel with its axis, a coöperating member having a screw threaded end portion with a cylindrical socket, a socket member having a bore, a portion thereof interiorly threaded to be secured and adjusted upon said screw threaded end portion of said coöperating member, a lock nut for locking the same in adjusted position, the said socket member having a spherical socket therein provided with an entrance opening having opposing partially curved surfaces and opposing straight surfaces adapted to permit the entrance of the flattened ball, a recessed bearing block mounted in the said bore, and a spring engaging the recess in said block and the socket in said coöperating member whereby the block resiliently engages the said ball member for taking up wear and slack within the socket member.

In witness that I claim the foregoing I have hereunto subscribed my name this 19th day of February, 1912.

HARRY C. TURNER.

Witnesses:
 EDMUND A. STRAUSE,
 EARLE R. POLLARD.